No. 896,498. PATENTED AUG. 18, 1908.
R. WILLIAMSON.
BEEHIVE.
APPLICATION FILED FEB. 26, 1907.
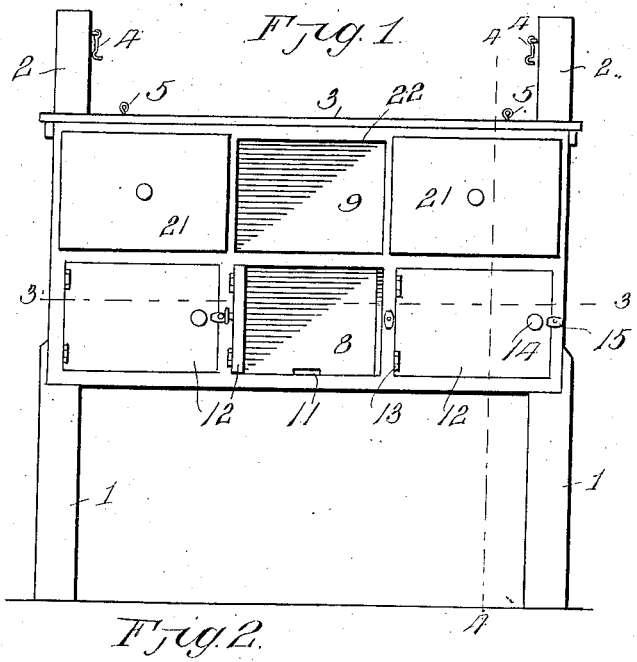
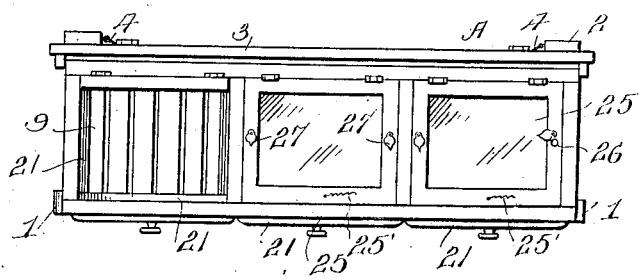
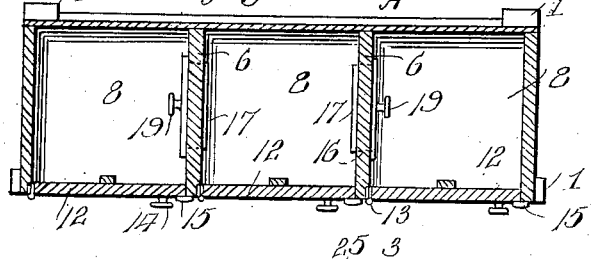
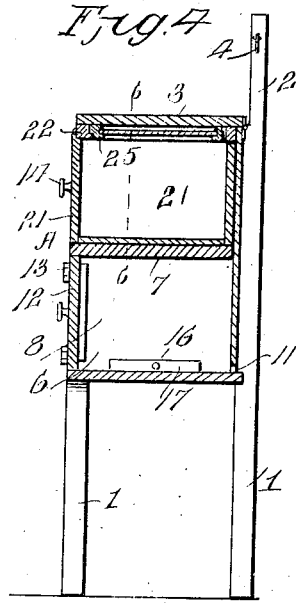
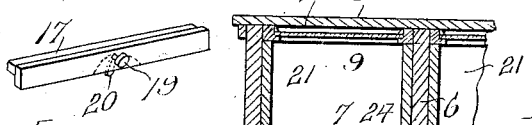
Inventor
Richard Williamson,
By Victor J. Evans
Attorney
Witnesses
Frank Hough
K. Allen

UNITED STATES PATENT OFFICE.

RICHARD WILLIAMSON, OF BUFFALO, KANSAS.

BEEHIVE.

No. 896,498.  Specification of Letters Patent.  Patented Aug. 18, 1908.

Application filed February 26, 1907. Serial No. 359,375.

*To all whom it may concern:*

Be it known that I, RICHARD WILLIAMSON, a citizen of the United States, residing at Buffalo, in the county of Wilson and State of Kansas, have invented new and useful Improvements in Beehives, of which the following is a specification.

This invention relates to bee hives and relates more particularly to a bee hive of that type which is provided with a plurality of compartments for accommodating the successive swarms of bees that swarm each year from the original colony.

The invention has for one of its objects to improve and simplify the construction and operation of devices of this character so as to be comparatively inexpensive and easy to manufacture, thoroughly reliable and efficient in use, and convenient to manipulate.
A further object of the invention is to provide a hive in which the swarming of the bees can be accomplished with a minimum of labor and attention and the supplies of honey taken from the hive in a simple and convenient manner without the bees being affected.

Another object of the invention is the provision of a bee hive having a plurality of swarming compartments that can be thrown in communication at the swarming season so that a new swarm can pass into an empty compartment without the usual trouble attached to the swarming of bees.

A still further object is to provide drawers for receiving the brooding and extracting frames, said drawers being arranged in chambers above the swarming compartments and glass doors are arranged to conveniently ascertain the condition of the supply in the drawers at any time.

With these objects in view and others, as will appear as the description proceeds, the invention comprises the various novel features of construction and arrangement of parts which will be more fully described hereinafter and set forth with particularity in the claims appended hereto.

In the accompanying drawing, which illustrates one of the embodiments of the invention, Figure 1 is a rear elevation of a bee hive. Fig. 2 is a plan view with the hinged cover open and one of the glass doors raised. Fig. 3 is a horizontal section on the line 3—3, Fig. 1. Fig. 4 is a vertical section on the line 4—4, Fig. 1. Fig. 5 is a perspective view of the closures between the swarming compartments. Fig. 6 is a detail sectional view showing the slat construction between each swarming compartment and the adjacent drawer compartment.

Referring to the drawing, A designates the casing or body of the hive supported on legs 1, the front ones of which extend upwardly above the top of the body A to form rests 2 for the hinged cover 3, when the latter is open. On these rests 2 are hooks 4 that hook in eyes 5 on the cover to hold the latter open. This casing A is divided by vertical partitions 6 into chambers. In the present instance, a bee hive having three chambers is shown, but it is obvious that the invention can be carried out with any desired number of chambers. In each compartment is a horizontal partition 7 constructed of slats extending from the front to the rear wall of the casing and these partitions 7 divide the chambers into swarming compartments 8 and drawer compartments 9 that communicate through the slots 8' between the slats of the partition 7. Each compartment 8 has an opening 11 through which the bees pass in and out of the hive, one of such openings being shown in Fig. 1. At the rear of each compartment 8 is a door 12 hinged at 13 and provided with a knob 14 and locked closed by a turn-button 15. At the lower end of each partition 6 is a longitudinal slot 16 by means of which adjacent compartments communicate. When one of two adjacent compartments is empty, the slot 16 of the partition between them is shut by a closure 17. This closure, as shown in Fig. 5, is provided with a knob 19 having a latch 20 for holding the closure in place.

In the compartments 9 are drawers 21 for holding the honey comb boxes. These drawers are of rectangular form and slide in and out of the openings 22 in the back wall of the casing A. The bottoms of the drawers 21 are constructed of slats 23 that are arranged to register with the slats of the partition 7 so that the bees can pass through the slots 8' and 24 in passing between the compartments 8 and 9. Over each drawer 21 is a glass door 25 hinged at its front edge to swing upwardly against the cover 3 when the latter is open. Attached to the front edges of the doors 25 are cords 25' which serve as hand holds for raising the latter, cords being preferable since the hinged cover 3 can close down tight against the doors without the cords interfering. By means of these glass doors, the condition of the supply in any drawer 21 can be ascertained. Each door has smoke openings 26 closed by hinged covers 27. The doors 25 are so arranged that they fit into the top of the casing A and the hinged cover 3 closes down tight against the glass doors.

From the foregoing description, taken in connection with the accompanying drawings, the advantages of the construction and of the method of operation will be readily apparent to those skilled in the art to which the invention appertains. In first using the hive for the habitation of bees, the latter are placed in the central compartment of the hive, the closures 17 being first put in place so that the bees will not pass into the end compartments. The bees are thus confined to the middle compartment and here the brooding and work of the bees takes place. The honey comb is formed in the middle drawer 9 by the bees and this drawer can be readily taken out and another one substituted when the original one is filled. To do this, the cover 3 is opened and the hinged stoppers or covers 27 of the middle door 25 are moved to open the smoke apertures 26. Smoke is thus admitted into the upper middle compartment 9 so as to drive the bees downwardly into the swarming compartment 8 and the original drawer can then be taken out and a new one substituted without the change being discovered by the bees, this being accomplished without need of a mask since none of the bees fly out from the hive. Before the swarming season occurs in the second year, the operator takes out one of the closures 17 so that a new swarm of bees can pass into one of the end compartments. It will be noted that these closures open outwardly into the end compartments so that they can be taken out without exposing oneself to the bees. When the third swarming season occurs, the closure of the remaining empty compartments will be taken out for permitting the new swarm from the original colony to another. The number and arrangement can be varied to suit any requirement, as will be readily understood.

I have described the principle of operation of the invention, together with the apparatus which I now consider to be the best embodiment thereof, but desire to have it understood that the apparatus shown is merely illustrative and that such changes may be made when desired, as are within the scope of the claims.

Having thus described the invention, what I claim is:—

1. A bee hive comprising a casing, vertical partitions dividing the casing into compartments, the lower ends of the partitions being recessed to form openings between the compartments, doors for closing the openings, openings in the front of the casing at the bottom thereof for providing means of egress and ingress for the bees, horizontal partitions in the compartments dividing the same into upper and lower chambers and formed of slats, doors at the rear of the lower chambers, drawers fitting in the upper chambers and provided with slatted bottoms for providing slots to register with the slots of the horizontal partition, said drawers being open at the top, glass doors covering the tops of the drawers and bearing directly on the walls of the latter, and a cover extending over the top of the casing for protecting the glass doors.

2. A bee hive comprising a casing, partitions therein dividing the same into chambers and provided with openings at their bottoms, closures for the openings, slotted horizontal partitions in the chambers dividing the latter into compartments, rear doors for the lower compartments, rearwardly opening drawers for the upper compartments, said drawers having slotted bottoms, glass doors hingedly mounted in the top of the casing for covering the drawers and provided with smoke openings, closures for the smoke openings, and a single hinged cover adapted to close down over all the glass doors and projecting beyond the doors to prevent the entrance of rain to the casing.

3. A bee hive comprising a casing, legs supporting the same, upwardly extending rests on the casing, a hinged cover for the casing, locking devices for holding the cover open against the rests, partitions in the casing dividing the same into chambers, horizontally disposed glazed doors hingedly mounted on the casing at the upper ends of the chambers, drawers in each chamber disposed directly under the glazed doors, and doors for the spaces below the drawers.

In testimony whereof, I affix my signature in presence of two witnesses.

RICHARD WILLIAMSON.

Witnesses:
 A. E. PATTY,
 L. A. SPRAGUE.